Feb. 25, 1936.  O. EVINRUDE  2,031,881
MOTOR BICYCLE
Filed Dec. 26, 1933  3 Sheets-Sheet 1
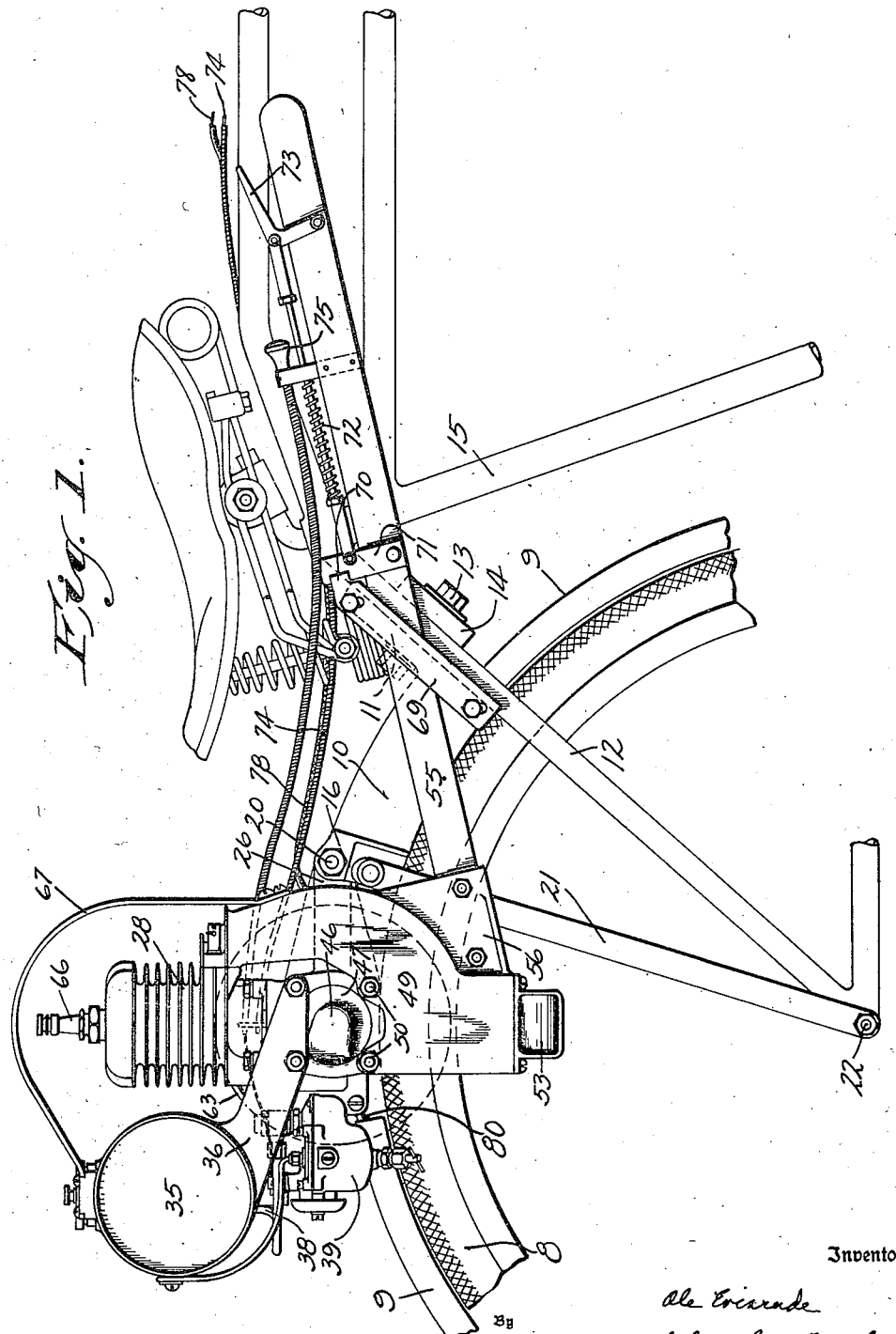
Inventor
Ole Evinrude
Wheeler, Wheeler & Wheeler
Attorneys

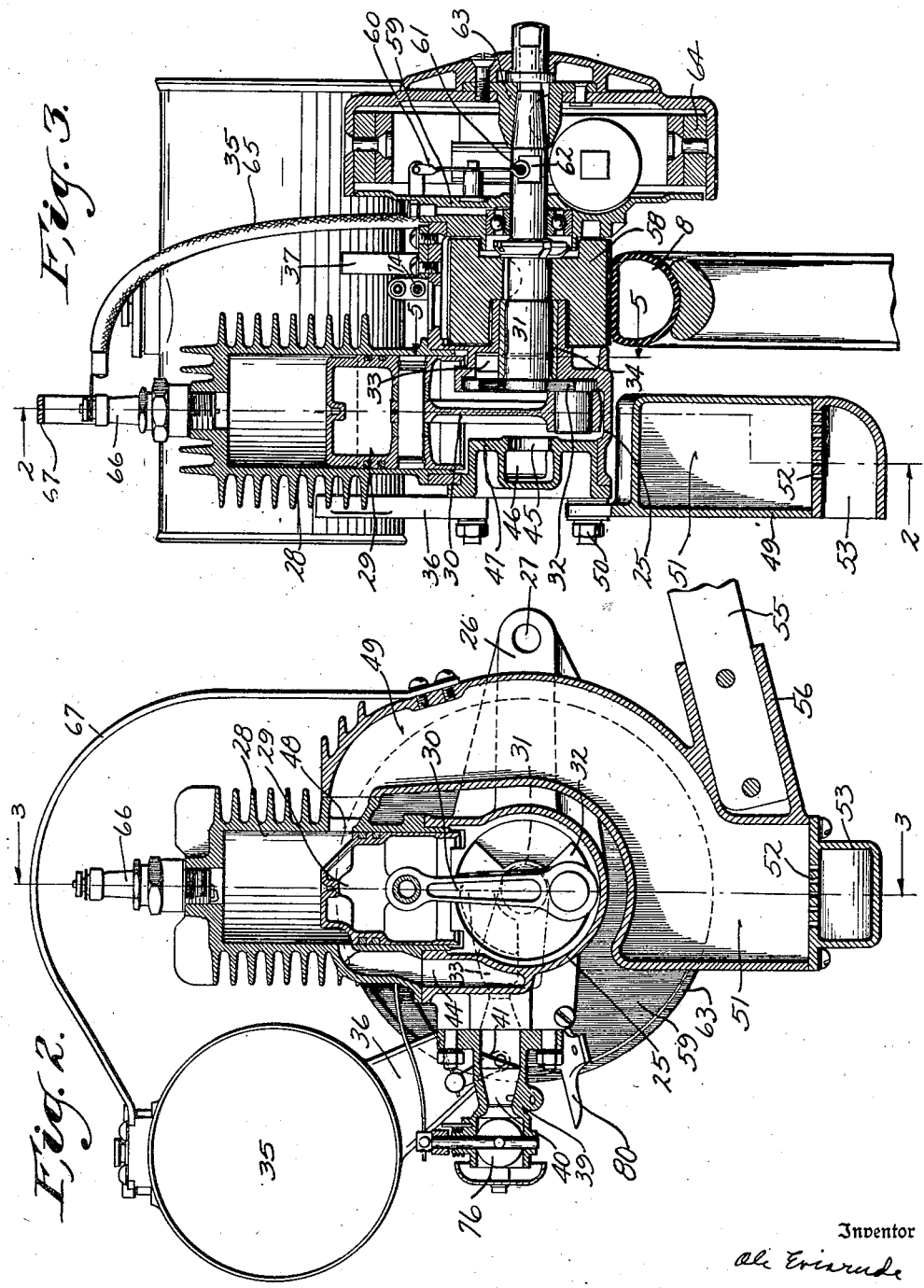

Feb. 25, 1936.  O. EVINRUDE  2,031,881
MOTOR BICYCLE
Filed Dec. 26, 1933  3 Sheets-Sheet 3
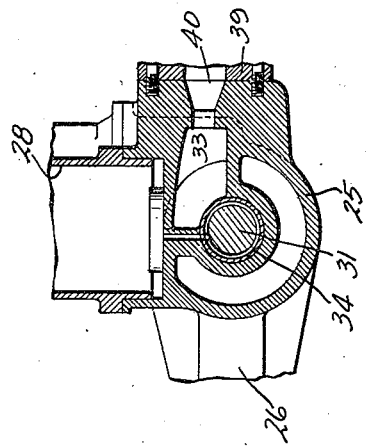
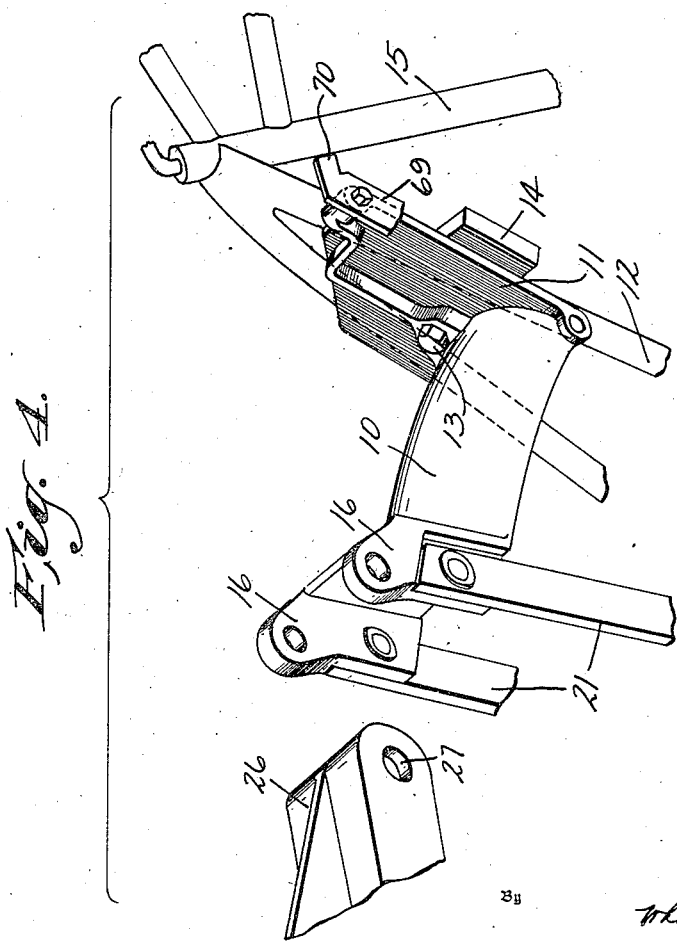
Inventor
Ole Evinrude
Wheeler, Wheeler & Wheeler
Attorneys Patented Feb. 25, 1936

2,031,881

UNITED STATES PATENT OFFICE 2,031,881

MOTOR BICYCLE

Ole Evinrude, Milwaukee, Wis., assignor to Outboard Motors Corporation, Milwaukee, Wis., a corporation of Michigan Application December 26, 1933, Serial No. 703,955

11 Claims. (Cl. 180—33)

This invention relates to improvements in motor bicycles.

Broadly stated, it is the object of the present invention to provide a novel, simple, compact organization of engine and driving pulley, subject to complete control, and effective in a simple manner to propel a conventional bicycle.

More specifically, it is my purpose to provide a bicycle motor in which the assembly is substantially balanced as to weight, the cylinder, crank case and muffler assembly being on one side of the bicycle wheel and the engine, fly-wheel and magneto on the other, with the driving roller or pulley between the fly-wheel and the crank case in a position to engage the bicycle tire, the parts being distributed symmetrically as to size and weight.

With particular reference to the engine, it is an object of the invention to provide means in a two cycle engine for preventing the transfer of lubricating oil from the crank case to the cylinder, to ensure a more effective lubrication of the crank case parts, and to reduce the amount of oil required.

Other objects, with particular reference to the compact and convenient organization of the structure, will appear from the following disclosure.

In the drawings:

Figure 1 is a view in side elevation showing a fragmentary portion of a bicycle and illustrating the application thereto of a bicycle motor embodying the present invention.

Figure 2 is a detail view of the engine assembly of my improved device as viewed in the plane indicated at 2—2 in Figure 3.

Figure 3 is a view in transverse section showing my device in the plane indicated at 3—3 in Figure 2.

Figure 4 is a fragmentary detail in perspective showing the mounting by which the device is applied to a conventional bicycle frame.

Figure 5 is a fragmentary sectional view taken in the plane indicated by the line 5—5 in Figure 3.

Like parts are identified by the same reference characters throughout the several views.

The mounting for my device is an important factor contributing to its successful installation on a conventional bicycle. It replaces a section of the conventional mudguard 9 for the rear bicycle tire 8. A casting 10 provides a short length of substitute mudguard terminating at one end in a plate 11 adapted to abut the rear fork 12 of the bicycle and comprising one member of a clamp to engage said fork. Held to the plate 11 by means of a bolt 13 is a complementary clamping plate 14 which engages the inside of the fork, whereby rigidly to support the substituted mudgard section 10 from the bicycle frame 15. At its rear end the substituted mudguard section 10 terminates in a bracket having ears 16 to receive a pintle bolt 20 and shouldered for connection with braces 21 which are engaged over the rear axle 22 of the bicycle.

The entire motor assembly is fulcrumed on the pintle 20 for the pivotal adjustment which brings the driving pulley or roller to and from engagement with the tire 8 of the rear wheel, as will hereinafter be described.

The engine and driving parts are assembled upon a frame which includes the crank case 25 and the arm 26 which projects forwardly therefrom and is apertured at 27 to receive the pintle bolt 20.

Upon this crank case frame is mounted a conventional two cycle engine cylinder 28 within which a piston 29 is reciprocably connected by rod 30 with the crank shaft 31.

Mounted on the crank shaft 31 is a rotary valve 32, best shown in Fig. 2. This valve controls the ignition of the charge from passage 33 to the crank case. The passage 33 extends part way around bushing 34 which provides a suitable bearing in the crank case for the crank shaft 31.

The charge or mixture is made up as follows.

A tank 35 is carried on brackets 36 and 37 and connected by a pipe 38 with carburetor 39. The rear passage 40 through the carburetor is controlled by a throttle valve 41 and leads to the passage 33 which has valve controlled communication with the crank case as above described.

The crank case is preferably lubricated by mixing oil with the gasoline in tank 35.

In accordance with conventional practice in two cycle engines, the mixture compressed below the piston in the crank case is transferred to the combustion chamber in cylinder 28 through a transfer passage 44 formed partly in the crank case casting and partly in the cylinder casting and having its delivery end arranged to be uncovered by the piston in the position in which the parts are shown in Fig. 2. The communication of this passage with the crank case is novel, however, and is so designed as to minimize the amount of oil carried by the charge in the course of its transfer.

The entrance to transfer passage 44 from the crank case comprises a hole 45 at or near the center of the end closure 47 of the crank case and opening into chamber 46 leading to the transfer passage 44. The rotation of the crank shaft and crank pin tends to keep all of the fluids in the crank case in rotation at a relatively high speed. The fuel particles are quite largely atomized or vaporized and hence reduced to very small size and weight. The lubricating oil, however, is not capable of so high a degree of atomization and tends to accumulate in a heavier mist or in the form of small globules. The rotating fluids in the crank case constitute a very effective means for centrifugally separating the heavier particles of oil from the lighter particles of combustible mixture, since the discharge port 45 leading to the transfer passage is at the center of the crank case and can only receive the relatively lighter weight materials therefrom. The lubricating oil will remain in the crank case to a far greater degree than it has been possible to achieve in previous designs of two cycle engines.

The muffler plays an important part in the design of this device. The exhaust gases pass through the port 48 into the muffler casting 49 which is of sufficient size to assure thorough expansion and consequent elimination of noise. The casting extends about the crank case in spaced relation thereto, but is rigidly connected with the crank case or frame 25 of the device by bolts at 50. Below the crank case there is a large chamber 51 closed at its bottom by a foraminous plate 52 providing an outlet fitting at 53.

The adjustment of the entire assembly upon the bracket 16 is provided by means of a hand lever 55 held in a socket 56 formed on the muffler casting 49, the motion being transmitted through the muffler to the rest of the assembly.

The operation of the hand-lever will be described later. When the apparatus is in the position shown in the drawings, the driving roller or pulley 58 mounted on the crank shaft engages the tire 8 of the rear wheel of the bicycle with sufficient pressure to ensure an operative driving friction so that in the rotation of the crank shaft motion is transmitted directly to the tire from the pulley or roller 58.

Beyond the roller or pulley is the timer plate 59 of a conventional fly-wheel magneto. This plate is mounted by means of anti-friction bearings directly upon the crank shaft so as to be positioned thereby and to partake of any movements of the crank shaft which may occur due to the extension of the crank shaft so far beyond the bearing 34. The breaker mechanism generically designated by reference character 60, is mounted on this plate 59 and includes a cam follower 61 co-acting directly with the flattened cam surface 62 on the crank shaft 8. Beyond this point, the crank shaft is tapered in the conventional manner to receive the fly-wheel 63 which, as usual, is provided in its rim with magnets 64.

The output of the magneto and breaker mechanism is delivered by a wire 65 to the conventional spark plug 66. The operator is protected from accidental contact with this plug by means of a strap 67 which also constitutes a brace for holding the fuel tank 35 rigidly from the muffler casting 49 which, as above noted, is solidly connected with the crank case or frame of the device.

It will be noted from an inspection of Fig. 3 that the device is balanced symmetrically with reference to the rear tire. The relatively heavy fly-wheel magneto which is mounted on the crank shaft at one side of the driving roller 58 is opposed by the engine cylinder, crank case, and muffler, at the other side of the driving roller. When the device is in use its entire actual weight is sustained on the tire.

The controls permit the entire apparatus to be lifted from the tire either for idling or for the use of the bicycle independently of the driving mechanism. Bolted to the side of the bracket clamp plate 11 is a strap 69 constituting a guide for the adjusting lever 55. An extension 70 on this strap may be engaged in either of two positions by a pawl 71 biased by spring 72 and released by a hand grip 73. When the notch in the pawl is engaged with the extension 70 as shown in Fig. 1, the driving roller 58 will be clamped tightly upon the tire, as shown in Fig. 3. If it be desired to lift the motor assembly to free the roller of contact with the tire, the grip 73 will operate it to release pawl 71 from extension 70. The hand lever 55 is then depressed to oscillate the entire bicycle motor about the fulcrum pintle 20 to a position in which the roller clears the tire and the extreme end of the pawl is then engaged beneath the extension of plate 69, thereby supporting the bicycle motor in an elevating position with respect to the tire.

The other controls include a Bowden wire 74 leading to the handle bars where any conventional means of operation may be provided for the manipulation of the throttle valve 41, and a second Bowden wire having a knob at 75 and leading to the choke valve 76 on the carburetor, and a ground wire 78, also leading to the handle bars, where any convenient means may be used for grounding it to the frame of the bicycle and thereby short circuiting the magneto to stop the engine.

It will be noted that the forward portion of mudguard 9 remains secured to the rear fork 12 of the bicycle, and means is provided at 80 for supporting from the engine the front end of the rear portion of mudguard 9. Thus, the entire assembly is conveniently and expeditiously applicable to a conventional bicycle structure with very little change, and may be used or not under the complete control of the operator to provide a simple, compact, symmetrical and balanced means of bicycle propulsion by power.

I claim:

1. A bicycle motor mounting comprising the combination with a bicycle having a rear fork and a mudguard element spaced rearwardly from said fork, of a bracket member including a mudguard shaped portion and provided with a clamp engaged with said rear fork, said member projecting rearwardly from the clamp, brace means supporting said bracket member from another point on said fork, a motor frame element pivoted to said bracket member, and means connecting said motor frame element and mudguard.

2. A bicycle motor mounting comprising the combination with a bicycle fork having legs spaced to receive a wheel, of plates applied in clamping relation to said fork, a channel bracket member extending rearwardly from one of said plates about the wheel as a partial mudguard, and a bicycle motor frame pivoted to said member.

3. A device of the character described, comprising the combination with a bicycle frame engaging clamp, of a bracket carried thereby and projecting rearwardly therefrom, propulsion means pivoted upon said bracket, a lever connected with said propulsion means and projecting forwardly of said bracket, and a latch and latch keeper connected between said bracket and lever and releasably engaged with each other to fix said lever in either of two predetermined positions affecting the pivotal adjustment of said propulsion means with respect to said bracket.

4. In a device of the character described, the combination with a driving means, of an engine at one side thereof having a crank shaft upon which said means is mounted, a fly-wheel at the other side of said means upon said crank shaft and including magneto means for supplying said engine with ignition current, exhaust means extending about one side of said crank case to a point therebeneath, and charge forming means at the other side of said crank case.

5. In a device of the character described, the combination with a driving means, of an engine at one side thereof having a crank shaft upon which said means is mounted, a fly-wheel at the other side of said means upon said crank shaft and including magneto means for supplying said engine with ignition current, exhaust means extending about one side of said crank case to a point therebeneath, and charge forming means at the other side of said crank case, together with a fuel tank connected with said charge forming means and positioned thereabove substantially paralleling said crank shaft, and a brace extending across said engine from said fuel tank to said exhaust means.

6. In a device of the character described, the combination with a bracket, of propulsion means including a crank case provided with a forwardly extending arm pivoted to said bracket, said arm comprising a frame upon which the propulsion means is adjustable about said pivot, a cylinder and crank shaft operatively associated with said crank case, and an exhaust means connected with said cylinder and extending about said crank case to a point therebeneath, said exhaust means having a member providing a rigid connection between it and said crank case.

7. In a device of the character described, the combination with a bracket, of a crank case provided with a forwardly extending arm pivoted to said bracket and comprising a frame for the adjustment of propulsion means, a cylinder and crank shaft operatively associated with said crank case, and an exhaust means connected with said cylinder and extending about said crank case to a point therebeneath, said exhaust means having a member providing a rigid connection between it and said crank case, together with means connected with said exhaust means for manipulating the crank case and cylinder assembly about the pivotal connection of said arm with said bracket.

8. A mounting for attaching a bicycle motor to a bicycle having a rear fork with spaced leg portions and a wheel operating in the space between the leg portions, said mounting comprising a clamp applicable to the rear fork above the wheel, a bracket extending rearwardly from said clamp about the wheel and substantially in the plane thereof, and fulcrum means at the rear end of said bracket arranged to receive said motor.

9. In a bicycle and motor assembly, the combination with a rear bicycle fork having spaced legs and a wheel operable between the legs of said fork, of a clamp applied to the legs of said fork spanning said space above the position of the wheel therein, a bracket member carried on said clamp and projecting rearwardly therefrom about the wheel as a guard, and a bicycle motor having a portion fulcrumed to said member and operatively connected in potential driving relation to said wheel.

10. A device of the character described, comprising the combination with clamping members applicable to the rear fork of a bicycle, of a bracket projecting rearwardly therefrom, a propelling device comprising a frame pivoted to the bracket, an engine cylinder on the frame, an engine driven driving roller engageable and disengageable with a bicycle wheel upon the pivotal movement of said frame, exhaust means connected with the cylinder, and a lever rigidly connected with the exhaust means and projecting forwardly beyond said bracket, said lever being of a length such that its end will be available for manipulation in front of the rider of a bicycle to which said bracket is applied for adjusting said frame and device about said pivotal connection with said bracket.

11. A motor bicycle, comprising a bracket, an engine structure including a drive roller and pivotally connected with the bracket to receive support therefrom, a mounting clamp for connecting said bracket with a bicycle frame in a position such that said roller is engageable with and disengageable from a bicycle wheel upon the pivotal movement of said engine with respect to said bracket, a lever connected with said engine and projecting across and beyond said bracket to a position within easy reach of the operator, detent means engageable between said lever and bracket to fix the pivotal position of said engine and operatively arranged for manipulation by the operator in his manipulation of said lever, and an engine control extending from said engine to said lever and connected therewith to partake of the movement thereof whereby to be accessible to the operator in all positions of said lever independently of any extraneous connections to the bicycle.

OLE EVINRUDE.